United States Patent
Kim et al.

(10) Patent No.: US 10,595,341 B2
(45) Date of Patent: Mar. 17, 2020

(54) NAV OPERATION METHOD IN WIRELESS LAN SYSTEM AND STATION APPARATUS FOR SAME

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/750,820

(22) PCT Filed: Aug. 12, 2016

(86) PCT No.: PCT/KR2016/008874
§ 371 (c)(1),
(2) Date: Feb. 6, 2018

(87) PCT Pub. No.: WO2017/026833
PCT Pub. Date: Feb. 16, 2017

(65) Prior Publication Data
US 2018/0249503 A1   Aug. 30, 2018

Related U.S. Application Data

(60) Provisional application No. 62/203,923, filed on Aug. 12, 2015, provisional application No. 62/204,458, (Continued)

(51) Int. Cl.
*H04W 74/08* (2009.01)
*H04W 72/12* (2009.01)
*H04W 84/12* (2009.01)

(52) U.S. Cl.
CPC ....... *H04W 74/0816* (2013.01); *H04W 72/12* (2013.01); *H04W 84/12* (2013.01)

(58) Field of Classification Search
CPC ............ H04W 74/08; H04W 74/0816; H04W 74/0825; H04W 72/12; H04W 84/12
See application file for complete search history.

(56) References Cited

U.S. PATENT DOCUMENTS

2014/0334473 A1   11/2014   Zhang et al.
2016/0088618 A1*   3/2016   Barriac ............ H04W 74/0816
                                                                370/329

(Continued)

FOREIGN PATENT DOCUMENTS

WO   2014123349   8/2014
WO   2015050311   4/2015

(Continued)

OTHER PUBLICATIONS

PCT International Application No. PCT/KR2016/008874, Written Opinion of the International Searching Authority dated Nov. 7, 2016, 16 pages.

*Primary Examiner* — Un C Cho
*Assistant Examiner* — Lalita W Pace
(74) *Attorney, Agent, or Firm* — Lee Hong Degerman Kang Waimey

(57) ABSTRACT

A method for performing network allocation vector (NAV) operation by a station (STA) in a wireless LAN system, according to an embodiment of the present invention, comprises the steps of: receiving a first frame; and configuring NAV in accordance with basic service set (BSS) of the first frame, wherein the first frame is other BSS (OBSS) frame. If a received signal strength indicator (RSSI) is lower the OBSS packet detection (PD) level, an STA drops the OBSS frame without configuration of the NAV. And if second frame transmission of another STA following the OBSS (Continued)

frame is scheduled, the STA can defer the OBSS frame drop even if the RSSI is lower than the OBSS PD level.

8 Claims, 12 Drawing Sheets

Related U.S. Application Data filed on Aug. 13, 2015, provisional application No. 62/206,105, filed on Aug. 17, 2015.

(56) References Cited

U.S. PATENT DOCUMENTS

| | | | | |
|---|---|---|---|---|
| 2016/0249371 | A1* | 8/2016 | Zhou | H04W 74/008 |
| 2016/0330663 | A1* | 11/2016 | Zhou | H04W 4/025 |
| 2016/0374087 | A1* | 12/2016 | Liu | H04W 74/0808 |
| 2016/0381688 | A1* | 12/2016 | Hedayat | H04L 27/26 |
| | | | | 370/329 |
| 2017/0064713 | A1* | 3/2017 | Barriac | H04W 72/0453 |
| 2017/0064741 | A1* | 3/2017 | Zhou | H04W 74/0816 |
| 2017/0289987 | A1* | 10/2017 | Seok | H04W 74/00 |
| 2017/0311352 | A1* | 10/2017 | Lv | H04W 74/002 |
| 2018/0167970 | A1* | 6/2018 | Yoshimura | H04W 74/006 |

FOREIGN PATENT DOCUMENTS

| | | |
|---|---|---|
| WO | 2015066343 | 5/2015 |
| WO | 2015112780 | 7/2015 |

\* cited by examiner

NAV OPERATION METHOD IN WIRELESS LAN SYSTEM AND STATION APPARATUS FOR SAME

CROSS-REFERENCE TO RELATED APPLICATIONS

This application is the National Stage filing under 35 U.S.C. 371 of International Application No. PCT/KR2016/008874, filed on Aug. 12, 2016, which claims the benefit of U.S. Provisional Application No. 62/203,923, filed on Aug. 12, 2015, 62/204,458, filed on Aug. 13, 2015, and 62/206,105, filed on Aug. 17, 2015, the contents of which are all hereby incorporated by reference herein in their entirety.

TECHNICAL FIELD

The present invention relates to a method for managing a Navigation Allocation Vector (NAV) to increase a spatial reuse rate in a wireless local area network (WLAN) system and station apparatus for the same.

BACKGROUND ART

Standards for a WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams, and IEEE 802.11ax standards are under discussion.

DISCLOSURE OF THE INVENTION

Technical Task

In the IEEE 802.11ax system and the system therebeyond, a dense wireless environment capable of serving more users in a certain geographical area is required. Thus, a technology for improving a spatial reuse rate needs to be developed to support such a wireless environment.

Specifically, more research is required to improve a spatial reuse rate of a clear channel assessment (CCA) based network allocation vector (NAV) operation method.

Technical Solutions

To achieve these objects and other advantages, in an aspect of the present invention, provided herein is a method for performing network allocation vector (NAV) operation by a station (STA) in a wireless local area network (WLAN) system, including: receiving a first frame; and configuring a NAV in consideration of a basic service set (BSS) of the first frame, wherein when the first frame is an other BSS (OBSS) frame and a received signal strength indicator (RSSI) is lower than an OBSS packet detection (PD) level, the STA may drop the OBSS frame without configuring the NAV, and wherein when transmission of a second frame from another STA is scheduled after the OBSS frame, the STA may defer dropping of the OBSS frame even though the RSSI is lower than the OBSS PD level.

In another aspect of the present invention, provided herein is a station (STA) for performing network allocation vector (NAV) operation in a wireless local area network (WLAN) system, including: a receiver to receive a first frame; and a processor to configure a NAV in consideration of a basic service set (BSS) of the first frame, wherein when the first frame is an other BSS (OBSS) frame and a received signal strength indicator (RSSI) is lower than an OBSS packet detection (PD) level, the processor may drop the OBSS frame without configuring the NAV, and wherein when transmission of a second frame from another STA is scheduled after the OBSS frame, the processor may defer dropping of the OBSS frame even though the RSSI is lower than the OBSS PD level.

Preferably, when deferring dropping the OBSS frame, the STA may configure the NAV based on a duration field of the OBSS frame.

Additionally, when an RSSI of the second frame is lower than the OBSS PD or when the second frame is not detected within a predetermined time, the NAV configured by the OBSS frame may be reset.

Additionally, the predetermined time may be a time required to determine whether the second frame is another OBSS frame after the reception of the second frame.

Additionally, when an RSSI of the second frame is not lower than the OBSS PD, the STA may maintain the NAV configured by the OBSS frame.

Additionally, when the OBSS frame is a trigger frame, a request-to-send (RTS) frame, or a clear-to-send (CTS) frame, the STA may determine that the transmission of the second frame is scheduled.

Additionally, the OBSS PD level may have a value greater than that of a minimum sensitivity level applied to a frame in a BSS to which the STA belongs.

Advantageous Effects

According to the present invention, compared to the conventional CCA based NAV operation method, it is possible to not only improve a spatial reuse rate but also prevent a collision between STAs.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
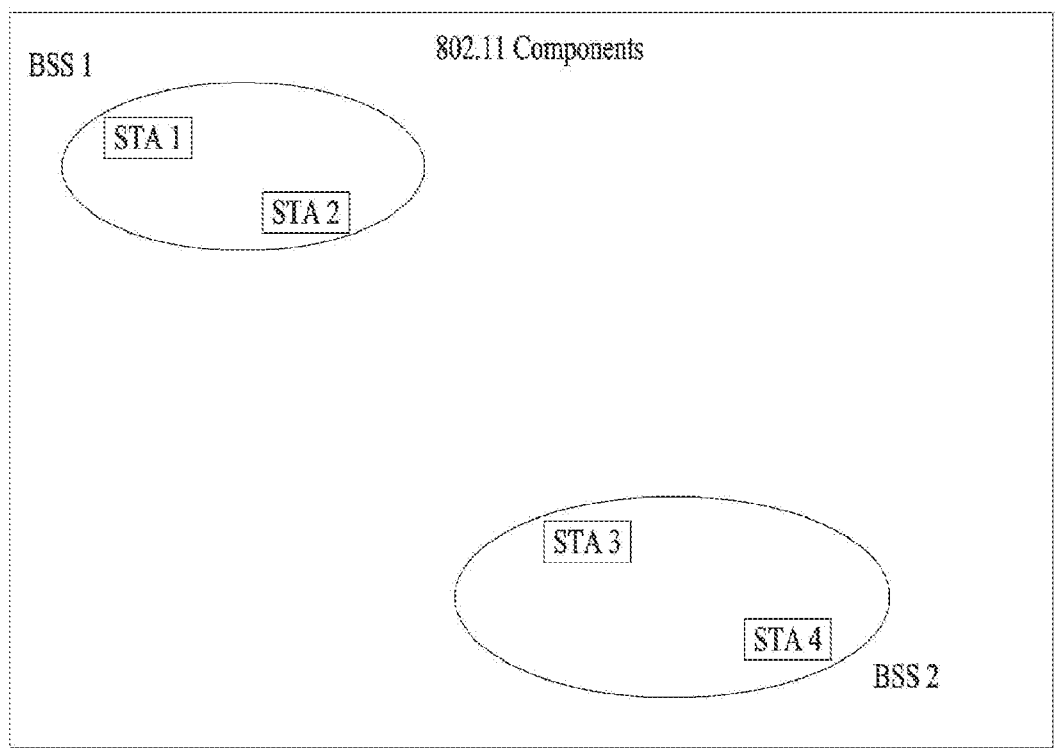
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
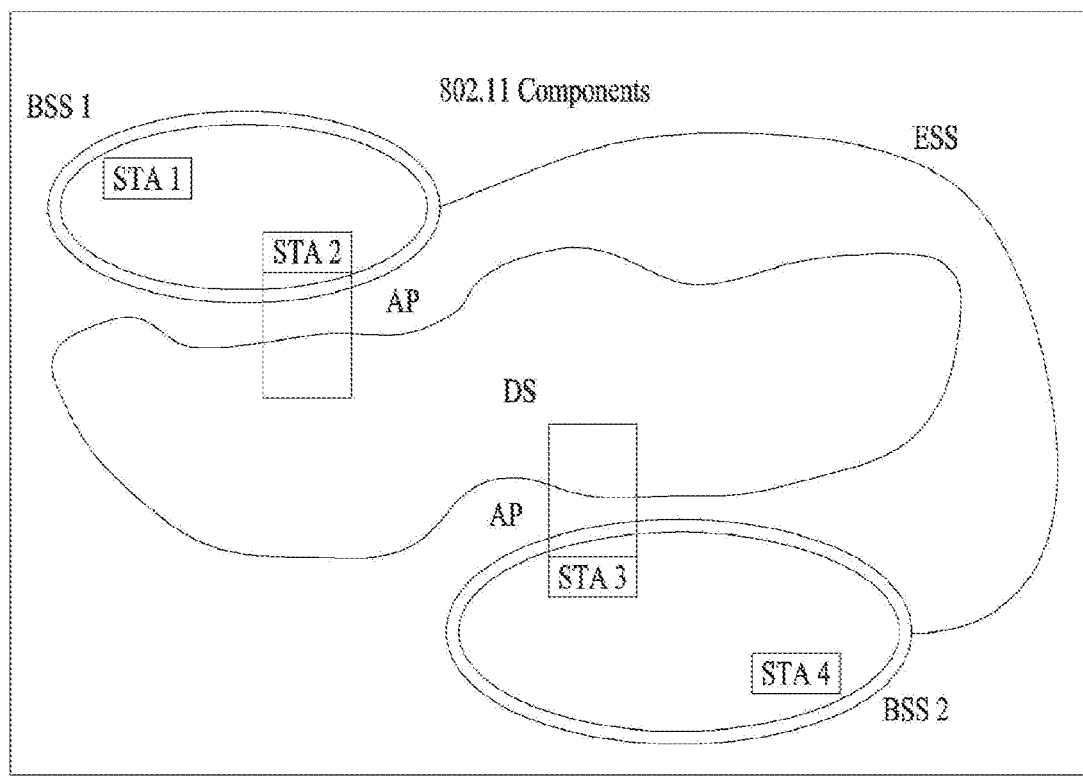
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above-described discussion, a collision detection technology of the WLAN system will be described.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

Figure 3:
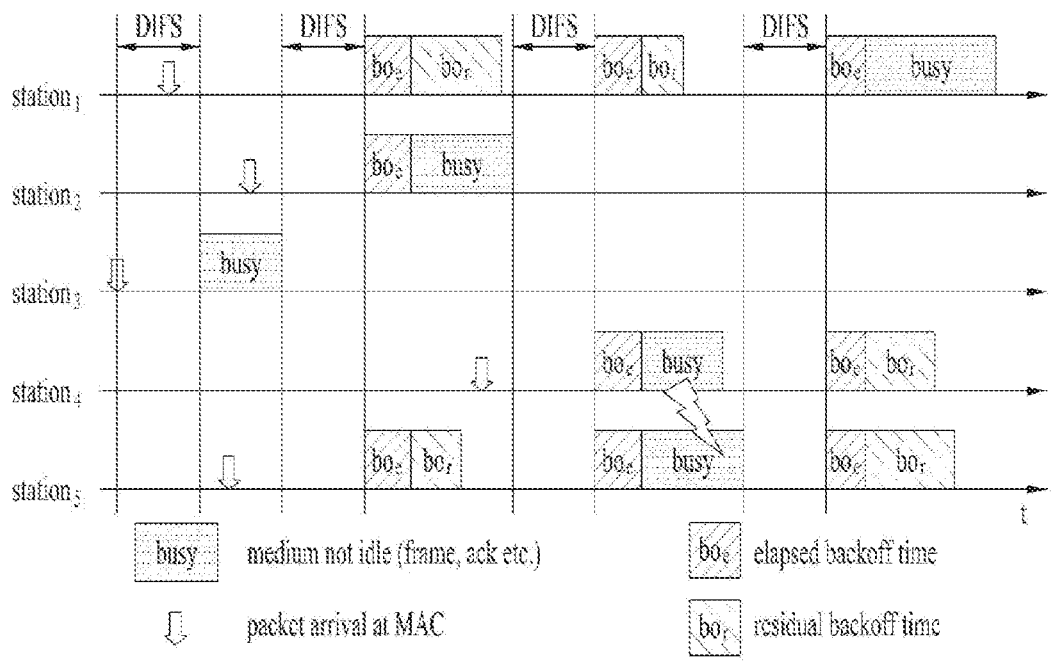
FIG. 3 is a diagram illustrating a DCF mechanism in a WLAN system.

FIG. 3 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 3, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 3 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 3, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 4:
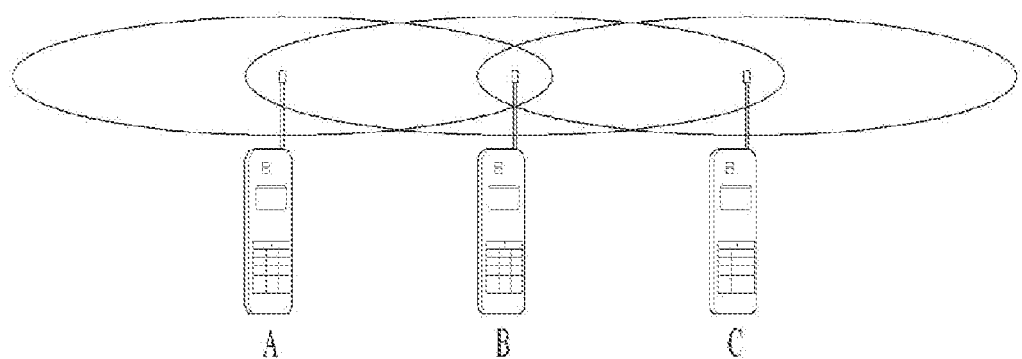
FIGS. 4 and 5 are diagrams illustrating problems of a conventional collision resolution mechanism.
Figure 5:
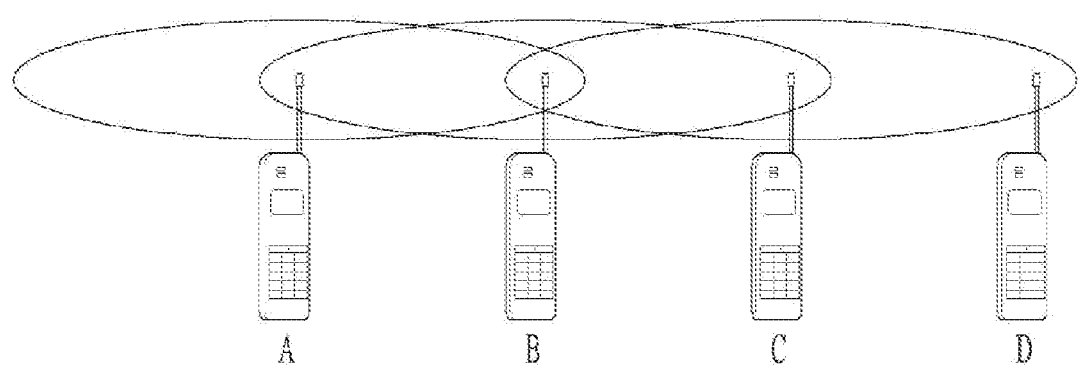

FIGS. 4 and 5 are view illustrating exemplary problems of a conventional collision resolution mechanism.

Specifically, FIG. 4 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 5 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 6:
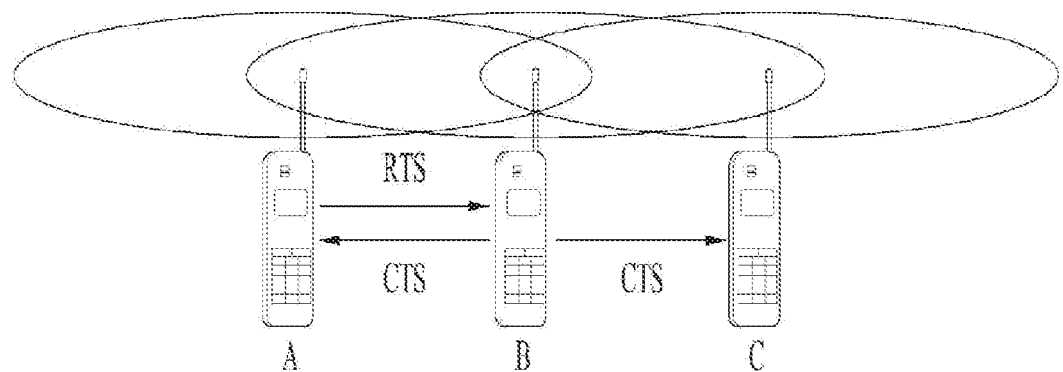
FIG. 6 is a diagram for explaining a mechanism of solving a hidden node issue using RTS/CTS frames.

FIG. 6 is a diagram for explaining a mechanism of solving a hidden node issue using an RTS/CTS frame.

Referring to FIG. 6, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 7:
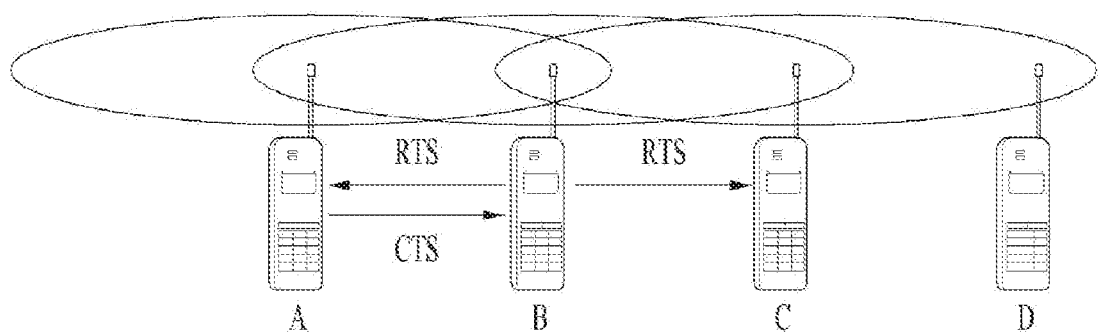
FIG. 7 is a diagram illustrating a mechanism of solving an exposed node issue using RTS/CTS frames.

FIG. 7 is a view illustrating a mechanism of solving an exposed node issue using an RTS/CTS frame.

Referring to FIG. 7, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 8:
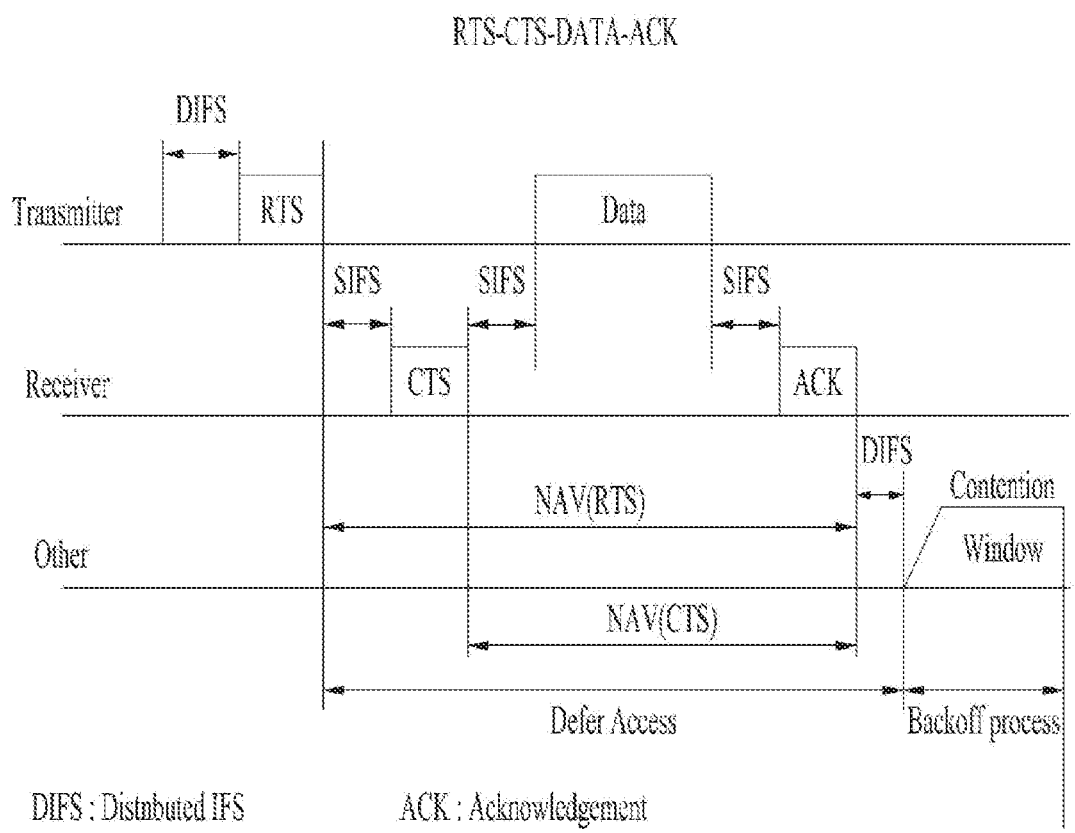
FIG. 8 is a diagram illustrating in detail an operation method using the above-described RTS/CTS frames.

FIG. 8 is a diagram illustrating in detail an operation method using the above-described RTS/CTS frames.

Referring to FIG. 8, after a Distributed IFS (DIFS), a transmitting STA may transmit an RTS frame to a receiving STA that intends to transmit a signal. After receiving the RTS frame, the receiving STA may transmit a CTS frame to the transmitting STA after a Short IFS (SIFS). After receiving the CTS frame from the receiving STA, the transmitting STA may transmit data after an SIFS as shown in FIG. 8. After receiving the data, the receiving STA may transmit an ACK response in response to the data received after an SIFS.

Meanwhile, among neighboring STAs except the above-mentioned transmitting and receiving STAs, an STA that receives RTS/CTS of the transmitting STA may determine whether a medium is busy or not according to RTS/CTS reception as described above with reference to FIGS. 6 and 7. Thereafter, the STA may configure a NAV based on the medium state. If a NAV duration ends, the STA may perform the contention resolution procedure described above with reference to FIG. 3 after a DIFS.

Based on the above discussion, a method for increasing a spatial reuse rate according to the present invention will be described.

Figure 9:
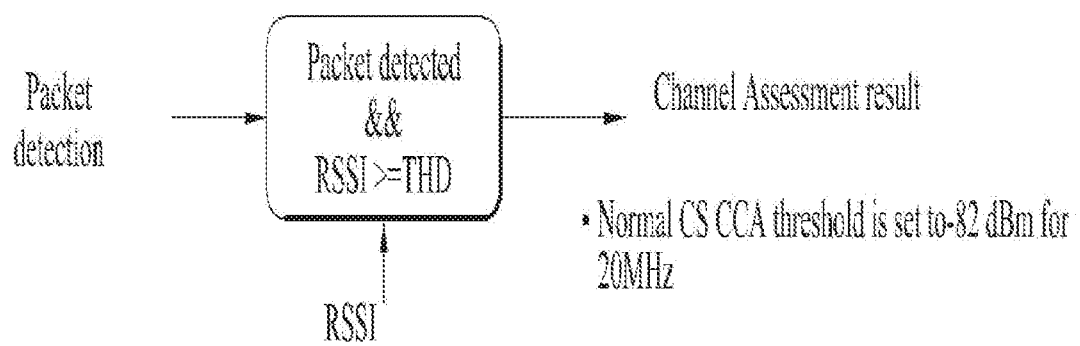
FIG. 9 is a diagram illustrating in detail the concept of general CCA based NAV operation.

FIG. 9 is a diagram illustrating in detail the concept of general CCA based NAV operation.

As described above, an STA needs to perform a backoff procedure to access a medium. Whether the medium is idle or busy is determined based on whether, when there is a frame received at a corresponding time, an RSSI of the received frame is higher than a CCA level corresponding to a predetermined threshold.

As illustrated in FIG. 9, a general CCA level used in the WLAN system is set to −82 dBm for a 20 MHz band. When the RSSI of the received frame is equal to or higher than −82 dBm, the STA updates a NAV based on duration field information of the corresponding frame.

To increase a spatial reuse rate, an embodiment of the present invention proposes that in the case of an other BSS (OBSS) frame, the STA determines whether the medium is busy using a higher CCA level as a reference and updates a NAV. In this case, the higher CCA level used for the OBSS frame is defined as an other BSS packet detection (OBSS PD) level. The OBSS PD level may be set to be higher than a minimum receive sensitivity level configured for the STA.

Whether a frame is an OBSS frame may be determined based on, for example, a BSS color included in an SIG-A field or a MAC address included in a MAC header. The OBSS frame can be referred to as an inter-BSS frame.

Thus, when the received frame is a frame (e.g., intra-BSS frame) from a BSS to which the STA belongs, the STA determines whether the medium is busy by applying a lower CCA level (e.g., minimum receive sensitivity level). On the other hand, when the received frame is an OBSS frame (e.g., inter-BSS frame), the STA can determine whether the medium is idle or busy by applying a higher CCA level (e.g., OBSS PD level). For example, when the RSSI value of the OBSS frame is lower than the OBSS PD level, the STA can determine that a channel is idle. That is, since a lowered CCA determination reference is applied to the OBSS frame in this manner, the probability of determining that the medium is busy decreases when the OBSS frame is received. In other words, when the OBSS frame is received, the probability that the STA use the channel increases. Accordingly, when the OBSS PD level is used, it is possible to achieve efficient spatial reuse.

The OBSS PD level can be used not only in determining a channel state (e.g., idle/busy) but also for updating a NAV for the OBSS frame. The NAV can be understood as a kind of a timer for restricting an STA in accessing a channel According to an embodiment, an STA can respectively set a NAV for the OBSS frame and a NAV for the intra-BSS frame, and the OBSS PD level can be used to update the NAV for the OBSS frame.

For example, when an OBSS MAC PDU is decoded and the RSSI of the corresponding frame is lower than the OBSS PD level, the STA does not update NAVs. However, if the OBSS PD level is applied to all OBSS frames as described above, it may cause the following problem.

Figure 10:
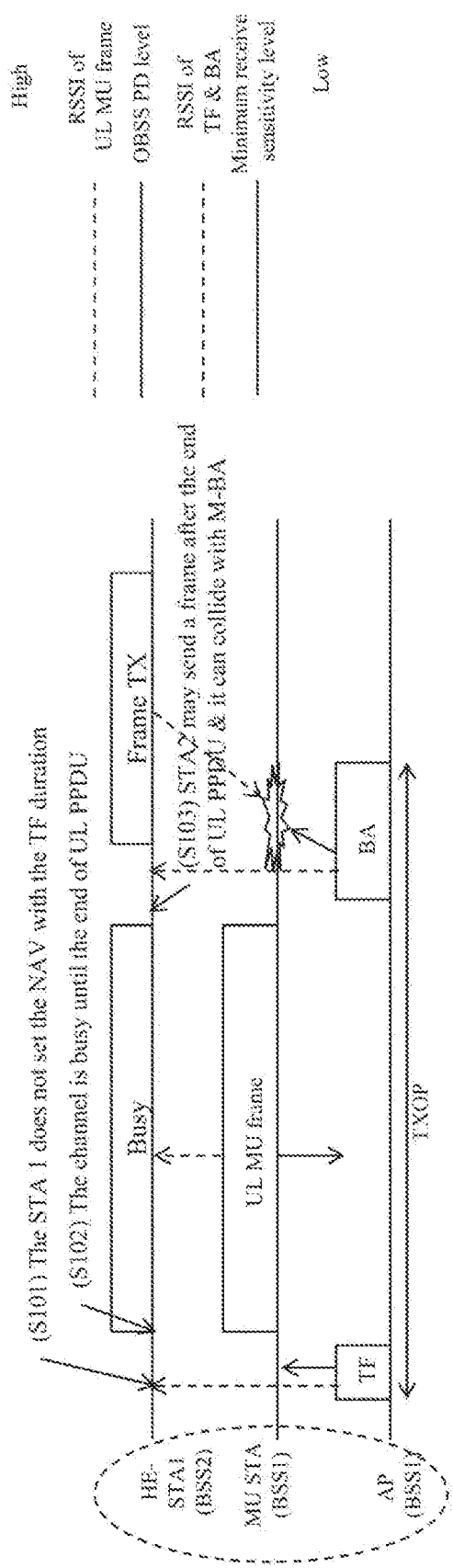
FIG. 10 illustrates a problem of NAV update based on an OBSS PD level.

FIG. 10 illustrates a problem of NAV update based on the OBSS PD level.

Referring to FIG. 10, HE-STA 1 belongs to BSS 2, and an MU STA and an AP belong to BSS 1. The HE-STA 1 is located relatively close to the MU STA but away from the AP.

First, the AP transmits a trigger frame, and TXOP information (e.g., duration field) is included in the trigger frame. The length of TXOP indicated by the trigger frame is configured so as to protect a UL MU frame to be transmitted by the MU STA and a block ACK frame to be transmitted by the AP.

The HE-STA 1 measures an RSSI of the trigger frame and compares the RSSI with the OBSS PD level. For convenience of description, it is assumed that the RSSI is lower than the OBSS PD level (RSSI<OBSS PD level).

Thus, the HE-STA 1 does not configure a NAV based on the trigger frame [S101].

Thereafter, after being instructed to perform UL transmission by the trigger frame, the MU STA transmits a UL MU frame.

The HE-STA 1 measures an RSSI of the UL MU frame. In this case, the RSSI is assumed to be higher than the OBSS PD level (RSSI>OBSS PD level). Thus, the HE-STA 1 determines that a channel is busy while the MU STA transmits the UL MU frame [S102].

Thereafter, when the UL MU frame transmission is completed, the HE-STA 1 determines that the channel is idle and can transmit a frame [S103].

However, since the AP transmits a BA frame while the HE-STA 1 transmits the frame, it is observed by the MU STA that the frame transmitted from the HE-STA 1 collides with the BA frame transmitted from the AP. Thus, the MU STA has a problem of not being able to correctly receive the BA frame transmitted from the AP.

Hereinafter, a description will be given of a method for solving the above-described problem.

The aforementioned problem is caused when the HE-STA 1 applies the OBSS PD level to the trigger frame transmitted from the AP. In other words, if the HE-STA 1 configured the NAV based on the trigger frame, the frames would not collide with each other.

Therefore, an embodiment of the present invention proposes that an STA selectively applies the OBSS PD level by considering a type of frame instead of applying the OBSS PD level to every OBSS frame (or a frame of which a BSS cannot be specified). That is, in a certain type of OBSS frame, an STA may determine whether a medium is idle and/or whether the STA configures a NAV by applying the OBSS PD level to the certain type of OBSS frame, but in another type of OBSS frame, the STA may determine whether the medium is idle and/or whether the STA configures the NAV without applying the OBSS PD level. In the case of the OBSS frame to which the OBSS PD level is not applied, a different CCA level (e.g., minimum receive sensitivity level) may be applied.

As a particular example, an STA may not apply the OBSS PD level to a trigger frame. If receiving an OBSS frame, the STA determines whether the corresponding frame is a trigger frame. If it is determined the OBSS frame is the trigger frame, the STA does not apply the OBSS PD level.

Such operation of the STA could be interpreted to mean that different CCA levels are applied according to the types of frames. For example, a plurality of CCA levels (or PD levels) with different sizes may be configured for an STA, and each of the CCA levels may be applied to a different type of OBSS frame. Specifically, if a PD level lower than the OBSS PD level applied to other OBSS frames is applied to an OBSS trigger frame, it is possible to minimize the probability of collisions between frames caused by a hidden node.

Meanwhile, when an STA does not apply the OBSS PD level to the OBSS trigger frame, the STA may not obtain spatial reuse gain. That is, the spatial reuse gain is reduced in terms of system performance Thus, a method for complementing the spatial reuse gain when the OBSS PD level is not applied will be discussed.

As described above, when an STA receives an OBSS trigger frame, the STA does not apply the OBSS PD level and configures a NAV based on a duration field included in the trigger frame.

Thereafter, based on a UL MU frame transmitted from another STA in response to the trigger frame, the STA may update the NAV configured by the trigger frame.

In this case, if an RSSI of a received OBSS UL MU frame is lower than the OBSS PD level or any UL MU frame is not received within a specific time (i.e., if there is no PHY-RXSTART.Indication), the STA determines that a channel is idle and resets the NAV configured by the trigger frame. Thereafter, if it is determined that there is no configured NAV, the STA may perform spatial reuse. In other words, if the NAV is not configured, the STA may perform channel access. Here, the specific time is a time required for the STA to receive a UL MU frame and determines whether the UL MU frame is an inter-BSS(/OBSS) frame. For example, it may be defined as [aSIFSTime+aRxPHYStartDelay], [aSIFSTime+aRxPHYStartDelay+aSlotTime], or [aSIFSTime+aRxPHYStartDelay+2*aSlotTime], but the present invention is not limited thereto.

On the contrary, if the RSSI of the received OBSS trigger frame is higher than the OBSS PD level, the STA may determine that the channel is busy and then maintain the configured NAV.

As another method, the STA applies the OBSS PD level to the OBSS trigger frame, but when the RSSI value of the received OBSS trigger frame is lower than the OBSS PD level, the STA may drop the OBSS trigger frame later if a predetermined condition is satisfied instead of immediately dropping the OBSS trigger frame (i.e., rather than immediately determining that the medium is idle). For example, when the STA receives the trigger frame having the RSSI value lower than the OBSS PD level, if an RSSI of an OBSS UL MU PPDU, which is received after the trigger frame, is lower than the OBSS PD level or any OBSS UL MU PPDU is not received within the specific time, the STA may drop the OBSS trigger frame.

If the predetermined condition is not satisfied, the STA does not drop the OBSS trigger frame. In this case, the STA determines that the medium is busy and configures the NAV based on the OBSS trigger frame.

Figure 11:
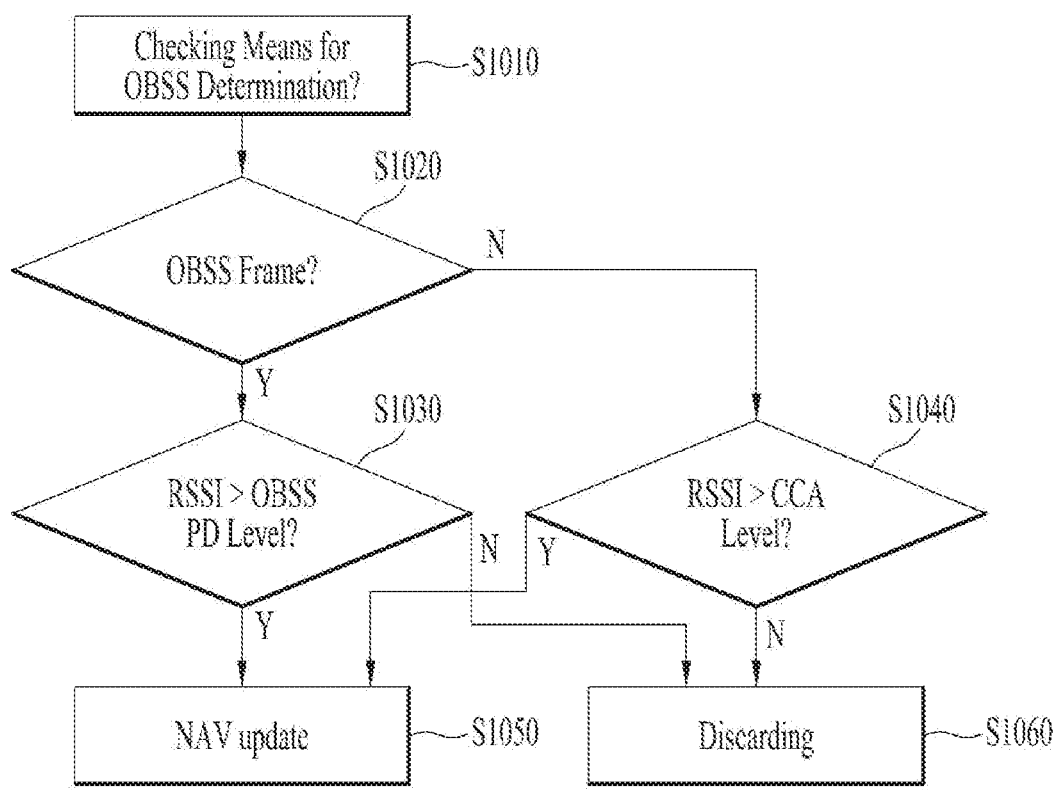
FIG. 11 is a diagram for explaining a method for improving a spatial reuse rate according to an embodiment of the present invention.

FIG. 11 is a diagram for explaining a method for improving a spatial reuse rate according to another embodiment of the present invention.

First, when a specific STA (hereinafter referred to as a first STA) receives a radio frame from a second STA, the corresponding radio frame preferably includes information used in determining whether it is an OBSS frame [S1010], and based on the information, the first STA can determine whether the received frame is an OBSS frame [S1020]. Since any one of RA/TA fields of a frame generally includes a BSSID regardless of whether the frame is transmitted in uplink or downlink, whether the frame is an OBSS frame can be checked based on either the RA field or the TA field. However, in the case of an RTS frame transmitted in downlink, which will be described alter, it is desirable to include additional information for determining whether the RTS frame is an OBSS frame.

If the received frame is an OBSS frame, the first STA determines whether an RSSI of the received frame is equal to or higher than the OBSS PD level greater than a CCA level (e.g., minimum receive sensitivity level) [S1030]. If the RSSI of the received frame is equal to or higher than the CCA level but lower than the OBSS PD level, the first STA may not update a NAV based on the corresponding frame [S1050] but drop the corresponding information [S1060].

If the received frame is a frame from a BSS to which the first STA belongs, the first STA compares the RSSI of the received frame with the CCA level [S1040]. If the RSSI is equal to or higher than the CCA level, the first STA updates the NAV [S1050]. On the contrary, if the RSSI is lower than the CCA level, the first STA may drop the corresponding information [S1060].

Figure 12:
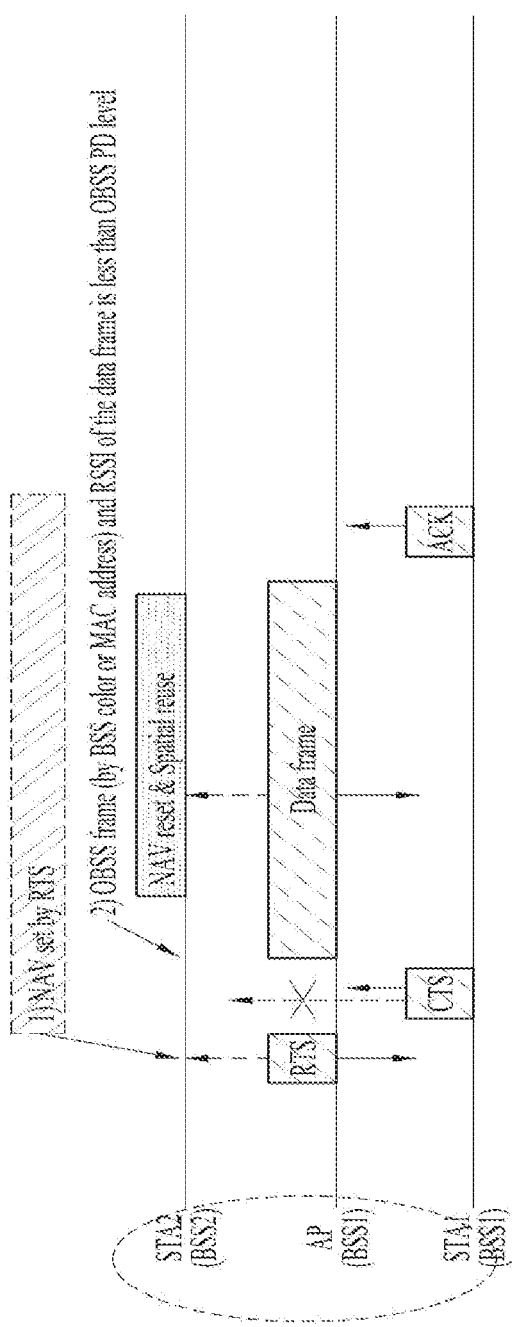
FIG. 12 illustrates an embodiment in which RTS/CTS frames are exchanged using the method described with reference to FIG. 11.

FIG. 12 illustrates an embodiment in which RTS/CTS frames are exchanged using the method described with reference to FIG. 11.

Referring FIG. 12, it is assumed that an AP and STA 1 belong to BSS 1, and STA 2 belongs to BSS 2. In addition, as shown in FIG. 12, it is also assumed that STA 2 is located close to the AP but far away from the STA 1.

To transmit data to the STA 1 in downlink, the AP may transmit an RTS frame to the STA 1. In this case, the transmitted RTS frame may be received by not only the STA 1 but also the STA 2 close to the AP.

In the present embodiment, it is assumed that RTS/CTS frames include information for determining whether each of them is an OBSS frame. In the case of the RTS frame, since an address of a TA field indicates a BSSID, the corresponding RTS is an OBSS frame, and thus the STA 2 may compare an RSSI of the RTS frame with the OBSS PD level. FIG. 12 shows an example in which since the RSSI of the RTS is higher than the OBSS PD level, the STA 2 configures a NAV according to the determination result.

After receiving the RTS frame from the AP, the STA 1 may transmit the CTS frame to the AP. In this case, the CTS frame may arrive at the STA 2.

As described above, it is assumed in the present embodiment that the CTS frame includes information for determining whether it is an OBSS frame. FIG. 12 shows an example in which the CTS frame includes a BSS color or a MAC address. That is, according to the example of FIG. 12, after receiving the CTS frame, the STA 2 may determine that an RSSI of the received frame is lower than the OBSS PD level and then discards CTS frame reception information.

Thus, similar to when no CTS frame is received within a predetermined time period after the reception of the RTS frame, the STA 2 may reset the configured NAV and thus transmit a data frame through a medium at the corresponding time.

Accordingly, a spatial reuse rate can be improved compared to when the conventional CCS is used.

The above-mentioned embodiments of the present invention are summarized as follows.

According to basic operation of the conventional WLAN system, a UE checks whether a radio channel is idle before using the channel, and only when the channel is idle, the UE uses the channel Checking whether a channel is busy or idle is called clear channel assessment (CCA), and a CCA threshold is determined by the system. If an RSSI of a received signal is higher than the CCA threshold, the UE considers that the channel is busy. On the contrary, if the RSSI is lower than the CCA threshold, the UE considers that the channel is idle. The CCA threshold may have a different value for each bandwidth, primary channel, or secondary channel, and the CCA threshold for signal detection may be different from that for energy detection. For example, in the conventional system (e.g., 11a/b/g/n/ac), the CCA threshold for signal detection (or packet detection) in the primary channel is set to −82 dBm. Thus, if the RSSI is lower than −82 dBm, the UE determines that the channel is idle. On the contrary, if the RSSI is higher than −82 dBm, the UE determines that the channel is busy.

Since whether a channel is available is determined based on the CCA, even when an STA is able to transmit a frame, the STA may not perform transmission by determining that the channel is busy based on the CCA, similar to the above-described exposed terminal problem. This may degrade performance of the WLAN system. To mitigate such performance degradation, if the CCA is set to be higher than the existing CCA threshold, it is possible to give more transmission opportunities to STAs. However, considering that it may affect transmission performed by other UEs, the CCA needs to have an appropriate value or in some cases, it should not increase.

When the CCA threshold increases as described above, the increased CCA threshold should not be applied to packets transmitted within a BSS (my BSS packet), that is, it can be applied to packets transmitted from a different BSS (different BSS packet). To determine whether a certain packet is a packet within the BSS (my BSS packet) or from the different BSS (different BSS packet), a BSSID included in an address field of a MAC header is checked (i.e., a receiver address in the case of UL and a sender address in the case of DL), or BSS color information (i.e., a short ID of a BSS) included in HE-SIG is checked.

Since a NAV is configured when either an RTS or a CTS is received, it is difficult to determine data appearing after the NAV is configured by the RTS/CTS as an OBSS packet or my BSS packet, and thus, it may be impossible to achieve spatial reuse. Similar to the above-described embodiment, it is possible to consider as a solution that whether each of the RTS/CTS is my BSS packet or the OBSS packet is determined, the CCA threshold for the OBSS packet (it is set to be higher than the conventional CCA threshold) is used, and whether the RTS/CTS will be dropped (i.e., weather the NAV will be configured based on duration field information included in the RTS/CTS) is determined.

The above-described OBSS PD level is applied to the RTS/CTS. When the RTS/CTS are my BSS packet, the OBSS PD level is not applied (i.e., the NAV is configured). On the contrary, when the RTS/CTS are OBSS packets, the OBSS PD level is applied to drop the frames. In the case of the RTS frame, since any one of the RA and TA includes the BSSID (in the case of DL, the TA includes the BSSID, and in the case of UL, the RA includes the BSSID), if any one of two addresses does not correspond to its own BSSID, the RTS frame may be considered as the OBSS packet (i.e., it is determined that the RTS frame is transmitted from another BSS).

Figure 13:
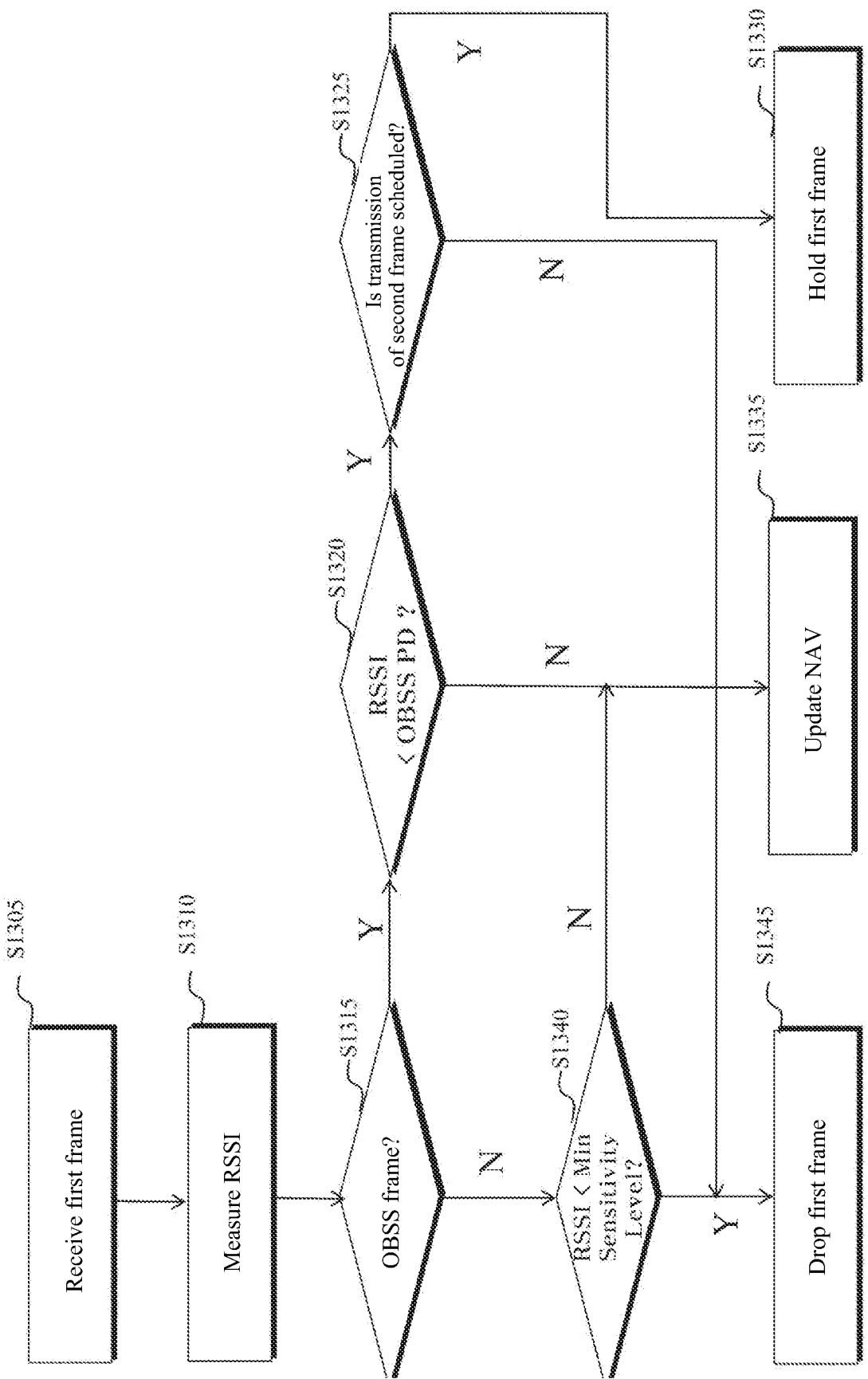
FIG. 13 is a flowchart illustrating a NAV operation method according to an embodiment of the present invention.

FIG. 13 is a flowchart illustrating a NAV operation method according to an embodiment of the present invention. The redundant description will be omitted.

Referring to FIG. 13, an STA receives a first frame [S1305].

The STA measures a received signal strength indicator (RSSI) of the first frame [S1310]. Although the RSSI measurement is assumed for convenience of description, other power measurement metrics can be used.

The STA configures a NAV by considering a Basic Service Set (BSS) of the first frame.

Specifically, the STA determines whether the first frame is an other BSS (OBSS) frame [S1315].

When the first frame is a frame in the BSS to which the STA belongs (e.g., my BSS frame), the STA compares the RSSI with a minimum sensitivity level in clear channel assessment (CCA) [S1340]. If the RSSI of my BSS frame is lower than the minimum sensitivity level, the STA drops the first frame [S1345]. After dropping the first frame, the STA may not configure/update the NAV and determine that a medium is idle. On the contrary, if the RSSI of my BSS frame is not lower than the minimum sensitivity level, the STA updates the NAV based on the first frame [S1335].

When the first frame is an OBSS frame and the RSSI is lower than an OBSS Packet Detection (PD) level, the STA drops the OBSS frame without configuring the NAV [S1345].

However, when transmission of a second frame from another STA is scheduled after the OBSS frame [S1325], the STA may defer dropping the OBSS frame even though the RSSI of the OBSS frame is lower than the OBSS PD level [S1330].

If dropping the OBSS frame is deferred, the STA may configure the NAV based on a duration field in the OBSS frame. When an RSSI of the second frame is lower than the OBSS PD or the second frame is not detected within a predetermined time, the STA may reset the NAV configured by the OBSS frame.

In addition, the predetermined time may be a time required to determine whether the second frame is another OBSS frame after the reception of the second frame.

Moreover, when the RSSI of the second frame is not lower than the OBSS PD, the STA may maintain the NAV configured by the OBSS frame.

Further, when the OBSS frame is a trigger frame, a request-to-send (RTS) frame, or a clear-to-second (CTS) frame, the STA may determine that the transmission of the second frame is scheduled.

Additionally, the OBSS PD level may have a value greater than that of the minimum sensitivity level applied to a frame in a BSS to which the STA belongs.

Figure 14:
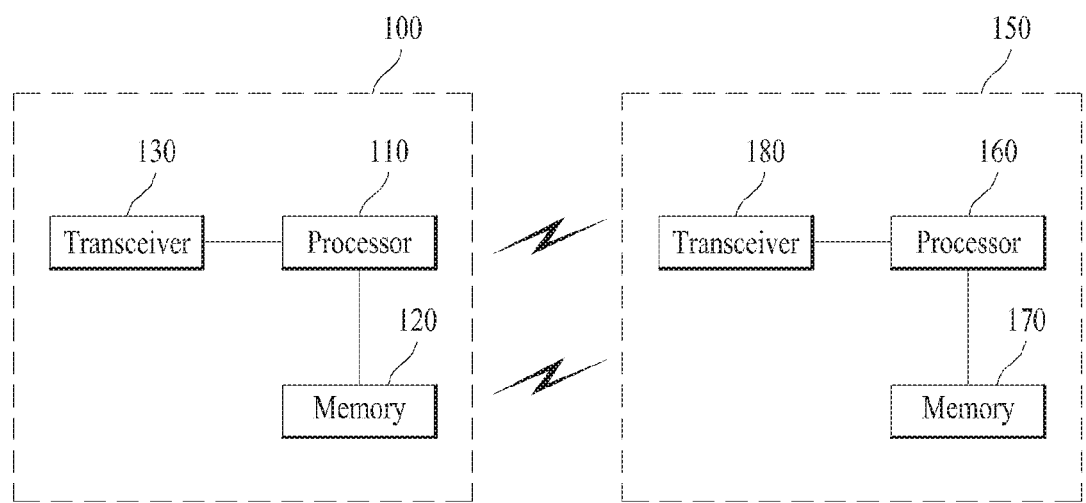
FIG. 14 illustrates devices for implementing the aforementioned methods.

FIG. 14 illustrates devices for implementing the aforementioned methods.

A wireless device 100 and a wireless device 150 in FIG. 14 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, it is not limited thereto. The present invention can be applied to various wireless systems, where the aforementioned spatial reuse scheme can be used.

What is claimed is:

1. A method for performing network allocation vector (NAV) operation by a station (STA) in a wireless local area network (WLAN) system, the method comprising:
   receiving a first frame, the first frame being a trigger frame, a request-to-send (RTS) frame, or a clear-to-send (CTS) frame;
   determining that the first frame is an other basic service set (OBSS) frame; and
   not dropping the first frame and configuring a NAV based on a duration field of the first frame even though a received signal strength indicator (RSSI) of the first frame is lower than an OBSS packet detection (PD) level.

2. The method of claim 1, further comprising:
   determining whether to reset the NAV configured by the first frame in consideration of an RSSI of a second frame received from another STA after the first frame; and
   when the RSSI of the second frame is lower than the OBSS PD level, resetting the NAV configured by the first frame.

3. The method of claim 2, wherein when the RSSI of the second frame is not lower than the OBSS PD level, the NAV configured by the first frame is maintained.

4. The method of claim 1, wherein the OBSS PD level has a value greater than that of a minimum sensitivity level applied to a frame in a BSS to which the STA belongs.

5. A station (STA) for performing network allocation vector (NAV) operation in a wireless local area network (WLAN) system, the STA comprising:
   a receiver to receive a first frame, the first frame being a trigger frame, a request-to-send (RTS) frame, or a clear-to-send (CTS) frame; and
   a processor to:
   determine that the first frame is an other basic service set (OBSS) frame; and
   not drop the first frame and configure a NAV even though a received signal strength indicator (RSSI) of the first frame is lower than an OBSS packet detection (PD) level.

6. The STA of claim 5, wherein the processor:
   determines whether to reset the NAV configured by the first frame in consideration of an RSSI of a second frame received from another STA after the first frame; and
   when the RSSI of the second frame is lower than the OBSS PD level, resets the NAV configured by the first frame.

7. The STA of claim 6, wherein when the RSSI of the second frame is not lower than the OBSS PD level, the NAV configured by the first frame is maintained.

8. The STA of claim 5, wherein the OBSS PD level has a value greater than that of a minimum sensitivity level applied to a frame in a BSS to which the STA belongs.

* * * * *